United States Patent [19]

Wildmoser

[11] Patent Number: 5,502,952
[45] Date of Patent: Apr. 2, 1996

[54] LOW THERMAL INERTIA SEALER

[75] Inventor: Martin M. Wildmoser, Florence, Ky.

[73] Assignee: R. A. Jones & Co. Inc., Covington, Ky.

[21] Appl. No.: 338,870

[22] Filed: Nov. 14, 1994

[51] Int. Cl.$^6$ .............................. B65B 43/04; B65B 3/02; B65B 51/16; B65B 51/26

[52] U.S. Cl. .............. 53/455; 53/562; 53/284.7; 156/498; 156/582; 493/191; 493/208

[58] Field of Search .................... 53/455, 479, 469, 53/284.7, 374.4, 374.5, 562, 570; 156/498, 529, 581, 582, 583.1; 493/191, 193, 197, 198, 205, 208

[56] References Cited

U.S. PATENT DOCUMENTS

| | | | |
|---|---|---|---|
| 2,948,999 | 8/1960 | Schlayer et al. | 493/191 X |
| 3,344,576 | 10/1967 | Cloud et al. | 53/455 |
| 3,453,799 | 7/1969 | Cloud et al. | 53/455 |
| 3,478,492 | 11/1969 | Cloud et al. | 53/284.7 |
| 3,563,001 | 2/1971 | Cloud et al. | 53/284.7 X |
| 3,597,898 | 8/1971 | Cloud . | |
| 3,821,873 | 7/1974 | Benner, Jr. et al. . | |
| 3,844,091 | 10/1974 | Vedvik et al. | 53/374.4 X |
| 3,908,979 | 9/1975 | Cloud et al. . | |
| 4,316,566 | 2/1982 | Arleth et al. . | |
| 4,436,576 | 3/1984 | Seiden | 156/582 X |
| 4,464,219 | 8/1984 | Colombo et al. | 493/208 X |
| 5,094,657 | 3/1992 | Dworak et al. | 53/374.4 X |

*Primary Examiner*—Horace M. Culver
*Attorney, Agent, or Firm*—Wood, Herron & Evans

[57] ABSTRACT

Vertical sealer apparatus in a pouch form, fill and seal machine capable of reducing undesirable vertical seal growth along a web of heat-sealable material. The apparatus includes a drum cast of aluminum and having a plurality of elongated slots directed along either side of a plurality of radially extending heated land areas which contact the web to form transverse seals. The apparatus further includes a fan to blow air through the elongated slots in the drum and along either side of the land areas to cool the web during intermittent operation of the vertical sealer apparatus.

15 Claims, 3 Drawing Sheets

LOW THERMAL INERTIA SEALER

BACKGROUND OF THE INVENTION

This invention relates to pouch machines and, more particularly, to an improved vertical sealer apparatus used in a continuous motion form, fill and seal machine having accelerated heating and cooling capabilities, respectively, for efficiently forming vertical seals along a folded web of heat-sealable material and for reducing undesirable vertical seal growth during intermittent operation of the vertical sealer apparatus.

The present application is related to the following United States patent applications filed on even date herewith and entitled: "Variable Count Direct Deposit Knife", by P. Dieterlen, Ser. No. 08/338,840 filed Nov. 14, 1994, pending; "Convertible Pitch Knife Apparatus", by P. Dieterlen, Ser. No. 08/338,848, filed Nov. 14, 1994, pending; "Convertible Pitch Pouch Machine", by F. Oliverio and B. Makutonin, Ser. No. 08/338,060, filed Nov. 14, 1994, pending, and "Tuck Roll With Improved Web Tension Control" by Martin Wildmoser and Frank G. Oliverio, Ser. No. 08/338,839, filed Nov. 14, 1994, pending, each of which is expressly incorporated herein by reference.

In pouch machines of the known art, such as disclosed in U.S. Pat. No. 3,597,898 which is herewith incorporated herein by reference, a flat web of heat sealable material is continuously fed from upstream of the pouch machine to be longitudinally folded upon itself by a plow or similar device. In this form, the thus-folded web is fed about a sealer which contacts the folded web along vertical heated land areas to form transverse vertical seals and, thus, a series of open pouches along the web. In this way, the web of open pouches is passed around a filler wheel, filled with product and then sealed along the top edge of the web. The web of filled pouches then passes downstream to a motor-driven rotary knife apparatus which cuts the web along the transverse vertical seals into separate individual pouches for subsequent cartoning or other secondary packaging.

In a typical apparatus for making vertical seals along a folded web, the apparatus includes a metallic rotary drum having a predetermined number of radially extending, outwardly facing sealing surfaces. The outwardly facing sealing surfaces of the drum lie in a circle and are circumferentially spaced such that the sealing surfaces contact the web along defined transverse areas of the web as it is passed around the rotary drum. The drums of the known art are typically cast of steel or similar material wherein the radially extending sealing surfaces are interconnected by metallic web areas which lie inwardly from and between the sealing surfaces.

In known operation of the vertical sealer, the sealing surfaces are heated by individual heaters at each sealing surface to a predetermined temperature such that the folded web, typically made of a single ply heat-sealable film or laminate of heat sealable film to paper or metallic foil, for example, reacts to the heated sealing surfaces to form transverse seals across the moving web, and thus, a train of pouches having open mouths is formed for receiving product downstream at the filler wheel. The web is typically preprinted with labels in such a fashion that the labels are spaced corresponding to the pitch of the sealing surfaces. When the web is properly registered with the vertical sealer in accordance with U.S. Pat. No. 4,316,566, for example, which is herewith incorporated herein by reference, each label is centered between a pair of transverse seals formed by the vertical sealer whereby the rotary knife apparatus cuts the web along a centerline of each transverse vertical seal to separate the web into symmetrical individual pouches.

In operation of continuous motion form, fill and seal machines, it is common for the vertical sealer apparatus and web to be stopped while adjustments are made to various aspects of the machine or to up- or downstream equipment. When this occurs, the web is held stationary against the heated sealing surfaces and the vertical seals have a tendency to grow in width as a result of the continuous heat being applied to the web. Furthermore, the web may even change color or burn as a result of the continuously applied heat. Even if the heat source is turned off, residual heat in the sealing surfaces can be deleterious to the web.

These undesirable conditions can be exacerbated when the web includes an inner metallic foil which conducts the heat from the sealing surfaces through the web, thereby accelerating the web's vertical seal growth and discoloration. As the web is then moved in later operation, the web either typically breaks as a result of being weakened by the continuous heat or the pouches formed by the vertical seals are now too small between the enlarged seals to receive the desired quantity of product fill. In either case, a portion of the web must now be discarded as scrap before proper operation of the pouch form, fill and seal machine can be continued.

To cure the problem of continuously heating the web during a shutdown, it was known before the present invention was made to include a ring of air outlets below the vertical sealer drum and concentric with the web being passed around the drum. In this way, compressed air is directed at the web through the air outlets in an attempt to cool the web during the shutdown while the heaters remain operational.

However, while this advance has been useful, the compressed air system in such a design adds cost and complexity to the pouch form, fill and seal machine. Moreover, the direction of the compressed air typically cannot be concentrated at critical web areas along either side of the heated sealing surfaces to further cool the web and prevent undesirable seal growth at these critical areas. Moreover, the continuously operational heaters reduces the cooling effect provided by the compressed air.

Furthermore, in rotary drums of the known art, the material and design of the drums typically does not provide for acceleration of the heating and cooling processes. For example, as the individual sealing surfaces are heated in the known drums, some of that heat is also transferred to the interconnecting web areas between the sealing surfaces. Thus, more energy and time is required to heat the sealing surfaces to a predetermined temperature as a result of the heat being lost to the web areas. After the sealing surfaces are heated to the predetermined temperature and a shutdown occurs, the vertical sealer drum becomes a large heat sink due to the heated web areas and the high thermal retention property of the steel drum. Residual heat from the drum and heat supplied from the operational heaters is continued to be applied to the web along the sealing surfaces during the shutdown, thereby resulting in undesirable vertical seal growth, discoloration and reduction of web strength.

Accordingly, an objective of the present invention has been to provide a vertical sealer apparatus used in a continuous motion form, fill and seal machine which will reduce undesirable vertical seal growth along a folded web of heat-sealable material during intermittent operation of the apparatus.

Another objective of the present invention has been to provide a vertical sealer apparatus which provides for accelerated heating of the sealing surfaces of the apparatus with minimal heat loss through the drum.

It has been a further objective of the present invention to provide a vertical sealer apparatus which has low thermal inertia properties for providing accelerated cooling of the sealing surfaces during intermittent operation of the apparatus.

SUMMARY OF THE INVENTION

To these ends, one embodiment of the present invention contemplates a vertical sealer apparatus having a rotary drum cast of aluminum which includes a plurality of radially extending sealing surfaces circumferentially spaced about the drum, a plurality of elongated slots directed along either side of the sealing surfaces and a concentric recess in the drum proximate and inward from the sealing surfaces. The sealing surfaces are heated by heaters disposed at each sealing surface such that, in connection with the elongated slots and the concentric recess, the sealing surfaces are substantially thermally isolated from the drum for accelerated heating of the vertical sealer to a desired sealing temperature with minimal heat loss through the drum. Preferably, the vertical sealer apparatus further includes a fan mounted on the rotary drum for blowing air through the elongated slots in the drum and onto the web along either side of the sealing surfaces to cool the web when the vertical sealer is stopped during a shutdown.

In a preferred operation of the present invention, the sealing surfaces are heated to a first predetermined temperature and the web of material is passed around the vertical sealer. The web contacts the sealing surfaces along a predetermined length of the web as it passes around the drum to form transverse vertical seals across the web. Temperature is measured by a thermocouple mounted adjacent one of the sealing surfaces and electrically coupled to a heat controller.

In the event of a shutdown of the machine so that the vertical sealer stops, the heat controller turns the fan on to blow air through the elongated slots in the drum along either side of the sealing surfaces to cool the web and reduce undesirable seal growth. At the same time, the heat controller turns the heaters off until the sealing surfaces reach a predetermined lower temperature limit as measured by the thermo-couple and heat controller combination. When the lower temperature limit is reached, the fan is turned off and the heat controller maintains the sealing surfaces proximate in temperature to the lower temperature limit by starting and stopping either the fan or the heaters as required. In this way, vertical seal growth is reduced or prevented while at the same time maintaining the sealing surfaces at an intermediate temperature for subsequent start-up operation of the vertical sealer apparatus.

It will be appreciated that the heaters are capable of raising the temperature of the sealing surfaces to a temperature adequate for forming the transverse seals along the web. However, due to the low thermal inertia of the vertical sealer represented by the aluminum material and the substantial thermal isolation of the sealing surfaces from the drum, less energy and time is required to reach and maintain the sealing surfaces at this sealing temperature. Moreover, on stopping the drum and heaters, the sealing surfaces cool more quickly to reduce or prevent undesirable vertical seal growth along the web. Blowing air through the slots further helps cool the web at critical areas along either side of the sealing surfaces during intermittent operation of the vertical sealer apparatus.

BRIEF DESCRIPTION OF THE DRAWINGS

These and other modifications and advantages will become even more readily apparent from the following detailed description of a preferred embodiment of the invention, and from the drawings in which.

DETAILED DESCRIPTION OF THE INVENTION

Figure 1:
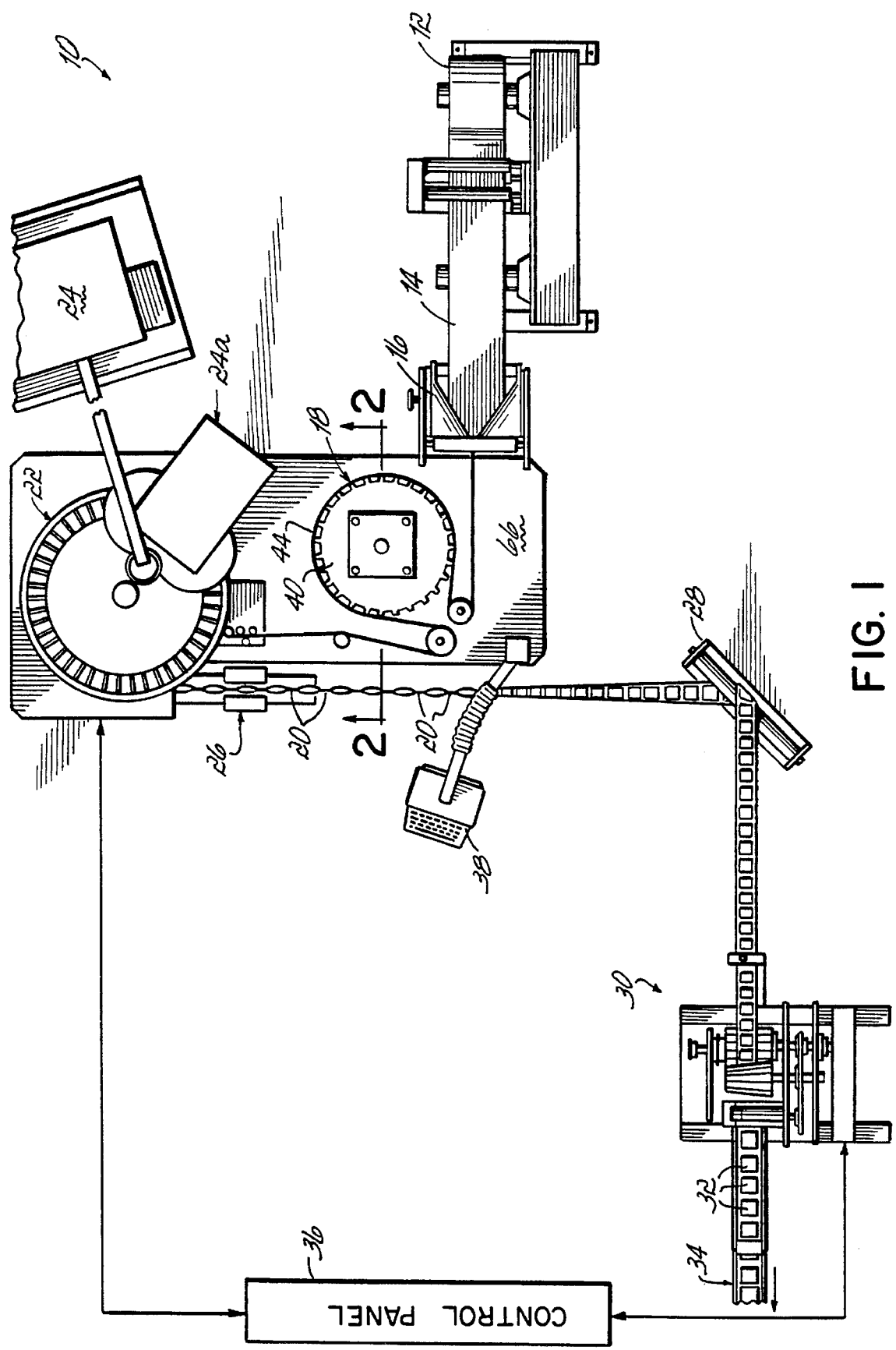
FIG. 1 is a diagrammatic plan view of a continuous motion form, fill and seal machine in which the present invention is used.

With reference to FIG. 1, a pouch form, fill and seal machine 10 is shown having a web supply 12 feeding a flat web 14 of heat-sealable material through plow 16 to be longitudinally folded upon itself. The thus-folded web is passed about a vertical sealer 18 having vertically extending heated sealing surfaces which contact the folded web along discrete areas to form transverse seals 20. In this way, open-ended pouches are formed along the web between the transverse seals 20 and are passed around a filler wheel 22 to be filled with product fed from a product feeding station 24. The train of filled open-ended pouches then passes through an upper edge sealer 26 which seals the pouches along respective open ends between the transverse seals 20. Product feeding station 24 may not be required, in a particular operation, the use of spout wheel filler 24a being sufficient to dispense measured product amounts into the spouts for pouch filling as will be described.

In one embodiment, the web of filled and sealed pouches is rotated 90 degrees through turning bar 28 and passed through a rotary knife apparatus 30 wherein the web of pouches is cut along the transverse seals 20 into individual pouches 32. Preferably, the individual pouches 32 are dropped onto a product transfer conveyor 34 disposed beneath the rotary knife apparatus 30 for subsequent cartoning or other secondary packaging. Operation of the pouch form, fill and seal machine 10 and the rotary knife apparatus 30 is controlled via a control panel 36 which receives user commands via an operator control console 38 and which further receives and generates appropriate control signals for operation of the machine 10 and the rotary knife apparatus 30 as will be described in more detail below. It will be appreciated that the control panel 36 includes controllers understood by those skilled in the art for operation of the pouch form, fill and seal machine 10.

Figure 2:
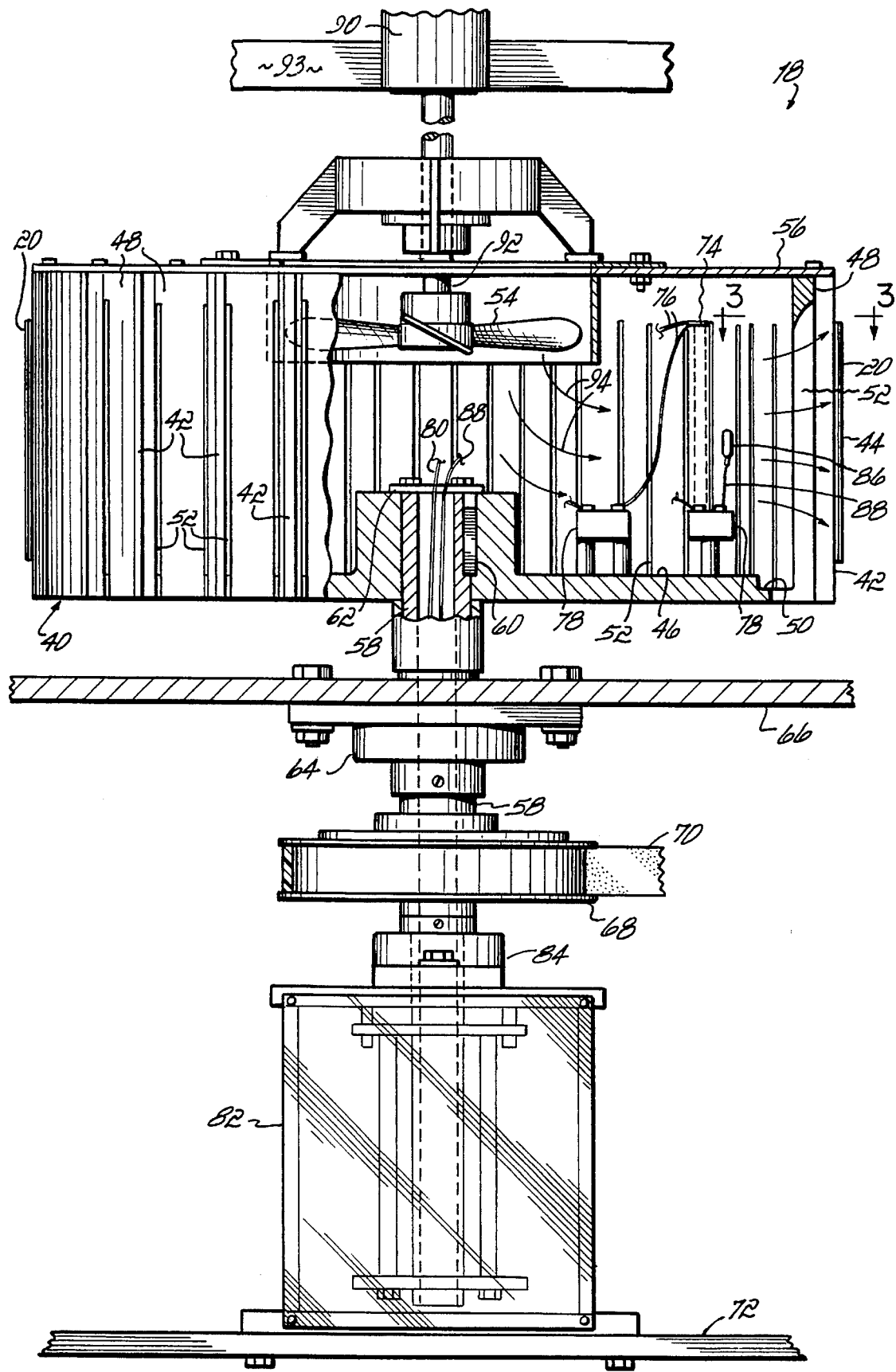
FIG. 2 is a partial cross-sectional view of the present invention taken along lines 2—2 of FIG. 1.
Figure 3:
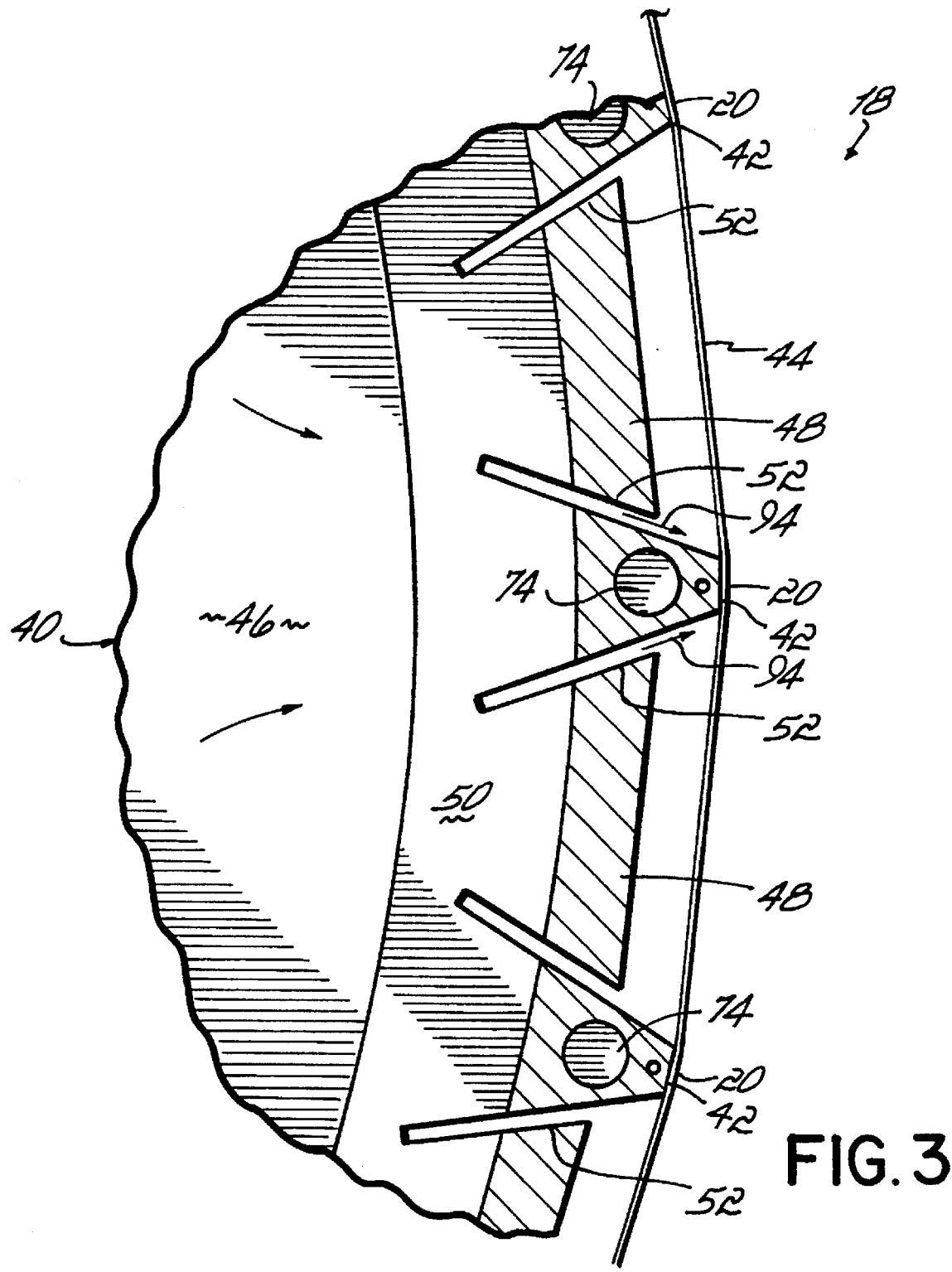
FIG. 3 is a cross-sectional view of the present invention taken along lines 3—3 of FIG. 2.

The vertical sealer 18 is the focus of the present invention and includes, as shown in FIG. 2, a vertical sealer drum 40 having a plurality of radially extending sealing surfaces 42 which contact a web 44 as the web passes around the drum 40 to form the transverse seals 20. It will be appreciated that the sealing surfaces 42 are equally spaced about the drum 40 to define a vertical seal pitch as shown in FIG. 3. In accordance with the present invention, the drum 40 is interchangeable with another drum (not shown) having a different vertical seal pitch as will be described in more detail below. Moreover, it will be appreciated that the sealing surfaces can be coated with a non-stick coating such as a teflon® treatment or any other suitable coating, not a part of this invention.

In one embodiment, the drum 40 is cast of aluminum by known manufacturing processes and includes a floor 46, metallic web areas 48 intermediate and inward from the sealing surfaces 42, a concentric recess 50 in the floor 46, and elongated slots 52 directed along either side of the sealing surfaces 42. Slots 52 are formed in the drum 40 by a cutting wheel which is passed partially through the drum 40 and upwardly from the floor 46 along either side of the sealing surfaces 42. It will be appreciated that other configurations of outlets in the drum 40 are contemplated in the present invention, including, by way of example, a series of smaller slots and/or apertures along either side of the sealing surfaces 42.

In accordance with the present invention, the vertical sealer 18 further includes a fan 54 mounted on a cover 56 attached to the drum 40 for purposes to be described in more detail below. The vertical sealer drum 40 is rotated via a shaft 58 keyed to the drum 40 through key 60 and is detachably secured about the shaft 58 by a retaining ring 62 fixed to the shaft. The shaft 58 extends through a bearing block 64 attached to a top plate 66 of the continuous motion form, fill and seal machine 10 (see FIGS. 1 and 2) and terminates at the retaining ring 62. The shaft 58 and, thus, the vertical sealer drum 40, are driven by a pulley 68 attached to a main drive assembly (not shown) through driving belt 70. In the present invention, the main drive assembly is disposed intermediate the top plate 66 and a bottom plate 72 of the pouch form, fill and seal machine 10.

In one embodiment of the present invention, the sealing surfaces 42 are heated by individual heaters 74 disposed at each sealing surface 42 (see FIGS. 2 and 3). The heaters 74 are powered via leads 76 (one shown) extending from buss bars 78 mounted on the floor 46 of the vertical sealer drum 40. Power is provided to the buss bars 78 through leads 80 (one shown) which extend through the shaft 58 from a commutator 82 supported in a bearing block 84. It will be appreciated that commutator 82 includes rings and brushes (not shown) to electrically couple power from a power source (not shown) to the buss bars 78 for further connection to the individual heaters 74.

Electrical control of the heaters 74 is provided by a heat controller (not shown) within the control panel 36 and at least one thermocouple 86 mounted adjacent a sealing surface 42 for measuring temperature of the sealing surface 42 during operation of the vertical sealer 18. The thermocouple 86 is electrically coupled to the heat controller through thermocouple leads 88 coupled to one of the buss bars 78. In this way, the thermocouple 86 sends an electrical signal to the heat controller corresponding to the temperature of the sealing surfaces 42 whereby the heat controller selectively operates the heaters 74 in accordance with the present invention. Additionally, the heat controller is further electrically coupled to a fan motor 90 for selectively operating the fan 54. The fan 54 operates via a shaft 92 driven by the fan motor 90 whereby the shaft 92 operates independently of the shaft 58 as will be described in more detail below. The fan motor 90 is attached to a fan support 93 fixed to the pouch form, fill and seal machine 10 such that the shaft 92 rotates with the drum 40 but is static relative to the drum 40 until the fan motor 90 is selectively operated by the heat controller in accordance with the present invention. There is a relative motion between the fan and the drum which results in a constant, slow exchange of the air within the drum. Thus, when the fan motor is operated, there is relatively cool air in the drum for immediate flow through slots 52. The fan could be run slowly during drum rotation to the same effect, instead of holding the fan still, relative to the drum, until the drum stops.

In a preferred operation of the present invention, the sealing surfaces 42 are heated to a predetermined temperature by the heaters 74 such as, for example, 350° F., whereby the web 44 is responsive to the sealing surfaces 42 at this predetermined temperature for forming the transverse seals 20. The web 44 is drawn about the vertical sealer drum 40 and the drum 40 is rotated at a predetermined angular speed corresponding to overall operation of the pouch form, fill and seal machine 10. In one embodiment, the web 44 contacts the sealing surfaces 42 along a 270° rotation of the drum 40 for forming the transverse seals 20 as shown in FIG. 1. The stationary or slowly moving fan causes a slow air exchange within the drum so the air temperature in the drum is maintained at substantially an ambient temperature.

In the event of a shutdown of the pouch form, fill and seal machine 10, such as, for example, in response to a CYCLE STOP signal received by the control panel 36, thereby stopping rotation of the vertical sealer drum 40, the heat controller selectively turns on the fan 54 via fan motor 90 to blow air, represented by arrows 94 in FIGS. 2 and 3, through the elongated slots 52 in the drum 40 and along either side of the sealing surfaces 42 to cool the web 44. At the same time, the heat controller turns off the individual heaters 74 until the sealing surfaces 42 reach a lower temperature limit such as, for example, 250° F. When the sealing surfaces 42 reach the lower temperature limit, the heat controller turns off the fan 54 and turns on the heaters 74 such that, by intermittently starting and stopping the fan 54 or the heaters 74, the sealing surfaces 42 are maintained proximate in temperature to the lower temperature limit until the vertical sealer 18 is either started again or completely turned off. Of course, the fan could be run so that air flows inwardly through the slots 52, but outward flow is preferred.

It will be appreciated that the vertical sealer drum 40 has low thermal inertia properties resulting from the aluminum cast material, the elongated slots 52 and the concentric recess 50. The elongated slots 52 and the recess 50 substantially thermally isolate the sealing surfaces 42 from the drum 40 such that minimal heat from the individual heaters 74 is lost through and thereby retained by the vertical sealer drum 40. In this way, undesirable vertical seal growth along the web 44 is reduced during intermittent operation of the vertical sealer 18.

Moreover, it will be appreciated that the fan 54, in connection with the elongated slots 52 in the vertical sealer drum 40, further reduces undesirable vertical seal growth along the web 44 by directing the air through the elongated slots 52 and along either side of the sealing surfaces 42 to cool the web when the vertical sealer 18 is stopped.

To convert the vertical sealer 18 to a different vertical seal pitch, the drum 40 is removed and replaced with a different drum having a substantially same diameter but different number of sealing surfaces 42. This is accomplished in the present invention by first disconnecting the fan motor 90 and the fan support 93 from the shaft 92 at a fan shaft collar (not shown) intermediate the fan motor 90 and the fan 54. After the fan motor 90 and the fan support 93 have been removed, the cover 56 and the associated fan 54 are detached from the drum 40. The power leads 80 and thermocouple leads 88 are then disconnected from the buss bars 78 and the retaining ring 62 is detached from the shaft 58. Lastly, the drum 40 is lifted and removed from the pouch form, fill and seal machine 10. After a different vertical seal pitch drum has been placed on the shaft 58, the vertical sealer 18 is reassembled in a substantially reverse procedure.

From the above disclosure of the general principles of the present invention and the preceding detailed description of a preferred embodiment, those skilled in the art will readily comprehend the various modifications to which the present invention is susceptible without departing from the scope of the present invention. Therefore, we desire to be limited only by the scope of the following claims and equivalents thereof.

What is claimed is:

1. An apparatus for forming transverse seals across a moving web of heat sealable material, comprising:

a rotary drum having a plurality of sealing surfaces about said drum, said sealing surfaces being in contact with said web for a predetermined length of said web as said web passes around said drum;

a plurality of heaters for heating said sealing surfaces to a predetermined temperature, said web being responsive to said sealing surfaces when said sealing surfaces are proximate in temperature to said predetermined temperature for forming said transverse seals; and a plurality of slots in said drum proximate each of said sealing surfaces, said sealing surfaces being at least partially thermally isolated from said drum by said plurality of slots when said sealing surfaces are heated by said heaters.

2. The apparatus of claim 1 further comprising:

at least one fan associated with said drum for selectively blowing air through said drum, said at least one fan thereby selectively blowing said air through said plurality of slots to cool said web.

3. The apparatus of claim 2 wherein said plurality of heaters is selectively inoperative.

4. The apparatus of claim 1 wherein said rotary drum is cast of aluminum.

5. The apparatus of claim 1 wherein said plurality of slots comprises an elongated slot directed along either side of said sealing surfaces.

6. The apparatus of claim 1 wherein said rotary drum further includes a concentric recess in said drum proximate said sealing surfaces, said sealing surfaces further being at least partially thermally isolated from said drum by said concentric recess when said sealing surfaces are heated by said heaters.

7. An apparatus for forming transverse seals across a moving web of heat sealable material, comprising:

a rotary drum having a plurality of radially extending sealing surfaces about said drum, said sealing surfaces being in contact with said web for a predetermined length of said web as said web passes around said drum;

a plurality of heaters, each of said heaters being associated with each of said sealing surfaces for heating said sealing surfaces to a predetermined temperature, said web being responsive to said sealing surfaces when said sealing surfaces are proximate in temperature to said predetermined temperature for forming said transverse seals;

at least one fan mounted on said drum for selectively blowing air through said drum; and a plurality of slots in said drum proximate each of said sealing surfaces, said sealing surfaces being at least partially thermally isolated from said drum by said plurality of slots when said sealing surfaces are heated by said heaters, said at least one fan further selectively blowing said air through said plurality of slots to cool said web.

8. The apparatus of claim 7 wherein said plurality of heaters is selectively inoperative.

9. The apparatus of claim 7 wherein said rotary drum is cast of aluminum.

10. The apparatus of claim 7 wherein said plurality of slots comprises an elongated slot directed along either side of said sealing surfaces.

11. The apparatus of claim 7 wherein said rotary drum further includes a concentric recess in said drum proximate said sealing surfaces, said sealing surfaces further being at least partially thermally isolated from said drum by said concentric recess when said sealing surfaces are heated by said heaters.

12. An apparatus for forming transverse seals across a moving web of heat sealable material, comprising:

a rotary drum having a plurality of radially extending sealing surfaces about said drum, said sealing surfaces being in contact with said web for a predetermined length of said web as said web passes around said drum; said drum being responsive to a CYCLE STOP signal for stopping rotation of said drum;

a plurality of heaters associated with each of said sealing surfaces, said heaters having ON and OFF states;

at least one fan mounted on said drum for blowing air through said drum, said at least one fan having ON and OFF states;

a plurality of slots in said drum, said slots being directed along each side of said sealing surfaces, said at least one fan blowing said air through said slots when said at least one fan is in said ON state; and a heat controller responsive to said CYCLE STOP signal and electrically coupled to said at least one fan and said plurality of heaters, said heat controller further having first and second thermal set points whereby said web is responsive to said sealing surfaces when said sealing surfaces are proximate in temperature to said first thermal set point for forming said transverse seals, said heat controller selectively operating said at least one fan intermittently between said OFF and said ON states and said plurality of heaters intermittently between said OFF and said ON states such that said sealing surfaces are maintained proximate in temperature to said second thermal set point in response to said CYCLE STOP signal to cool said web.

13. A method for forming transverse seals across a moving web of heat sealable material, said method comprising the steps of:

heating a plurality of sealing surfaces circumferentially spaced about a rotary drum to a first predetermined temperature;

drawing said web about said rotary drum;

rotating said drum at a predetermined speed, said web contacting said sealing surfaces for a predetermined length of said web as said web passes about said drum, said web being responsive to said sealing surfaces when said sealing surfaces are proximate in temperature to said first predetermined temperature for forming said transverse seals; and selectively blowing air through a plurality of slots in said drum proximate said sealing surfaces to cool said web when said drum is stopped from rotating.

14. The method of claim 13 further comprising the step of:

cooling said sealing surfaces below said first predetermined temperature when said drum is stopped from rotating.

15. The method of claim 13 further comprising the step of:

cooling said sealing surfaces below said first predetermined temperature and maintaining said sealing surfaces proximate in temperature to a second predetermined temperature when said drum is stopped from rotating.

* * * * *